United States Patent
Garai et al.

(10) Patent No.: US 8,984,325 B2
(45) Date of Patent: Mar. 17, 2015

(54) SYSTEMS AND METHODS FOR DISASTER RECOVERY OF MULTI-TIER APPLICATIONS

(75) Inventors: Debasish Garai, Maharashtra (IN); Ashish Gawali, Maharashtra (IN)

(73) Assignee: Symantec Corporation, Mountain View, CA (US)

(*) Notice: Subject to any disclaimer, the term of this patent is extended or adjusted under 35 U.S.C. 154(b) by 282 days.

(21) Appl. No.: 13/483,380

(22) Filed: May 30, 2012

(65) Prior Publication Data

US 2013/0326265 A1 Dec. 5, 2013

(51) Int. Cl.
*G06F 11/00* (2006.01)
*G06F 11/20* (2006.01)

(52) U.S. Cl.
CPC .......... *G06F 11/203* (2013.01); *G06F 11/2038* (2013.01)
USPC .............................................................. 714/1

(58) Field of Classification Search
CPC ............ G06F 11/1469; G06F 11/1456; G06F 11/2071; G06F 11/2097
USPC ..................................................... 714/1, 6.3
See application file for complete search history.

(56) References Cited

U.S. PATENT DOCUMENTS

| | | | |
|---|---|---|---|
| 7,818,408 B1 | 10/2010 | Ignatuk et al. | |
| 2009/0024868 A1* | 1/2009 | Joshi et al. | 714/4 |
| 2010/0023564 A1 | 1/2010 | Yerneni et al. | |
| 2010/0115332 A1 | 5/2010 | Zheng et al. | |
| 2010/0185894 A1 | 7/2010 | Herta | |
| 2010/0325472 A1* | 12/2010 | Allen et al. | 714/3 |
| 2011/0035491 A1* | 2/2011 | Gelvin et al. | 709/224 |
| 2011/0225095 A1 | 9/2011 | Gawali et al. | |
| 2012/0174112 A1* | 7/2012 | Vaidya et al. | 718/104 |

* cited by examiner

*Primary Examiner* — Yair Leibovich
(74) *Attorney, Agent, or Firm* — ALG Intellectual Property, LLC

(57) ABSTRACT

A computer-implemented method for disaster recovery of multi-tier applications may include 1) identifying a multi-tier application that is provisioned with a plurality of production clusters at a production site, 2) identifying a disaster recovery site including a plurality of recovery clusters, 3) identifying, at the disaster recovery site, a failure of the multi-tier application at the production site, and 4) initiating, from the disaster recovery site, a migration of the multi-tier application from the production site to the disaster recovery site. Various other methods, systems, and computer-readable media are also disclosed.

20 Claims, 6 Drawing Sheets

SYSTEMS AND METHODS FOR DISASTER RECOVERY OF MULTI-TIER APPLICATIONS

BACKGROUND

Multi-tier applications include independently executable components which, in combination, may provide a service. Organizations may use multi-tier applications for increased flexibility, scalability, security, and/or availability, since an organization may separately configure the execution environment of each component. For example, an organization may execute each component of a multi-tier application on a separate cluster and provision each cluster according to the requirements of the corresponding component of the multi-tier application. In some cases, the organization may wish to provide continuity for the multi-tier application in case of a disaster.

Disaster recovery refers to the capability to restore normal (or near-normal) business operations, from a critical business application perspective, after the occurrence of a disaster that interrupts business operations. In order to facilitate recovery from a disaster that affects the primary site of operation of an application, an organization may prepare a recovery system at a remote site to resume application operations in case of disaster.

Traditional disaster recovery systems may use a management server to orchestrate the recovery of multi-tier applications (e.g., to handle dependencies between the components of a multi-tier application during recovery). Unfortunately, these traditional systems may create a single point of failure for disaster recovery. For example, if the management server is unavailable, these systems may fail to recover the multi-tier application. Accordingly, the instant disclosure identifies and addresses a need for additional and improved systems and methods for disaster recovery of multi-tier applications.

SUMMARY

As will be described in greater detail below, the instant disclosure generally relates to systems and methods for disaster recovery of multi-tier applications by performing recovery management operations from one or more of the target clusters at the disaster recovery site. In one example, a computer-implemented method for disaster recovery of multi-tier applications may include 1) identifying a multi-tier application that is provisioned with a plurality of production clusters at a production site, 2) identifying a disaster recovery site including a plurality of recovery clusters, 3) identifying, at the disaster recovery site, a failure of the multi-tier application at the production site, and 4) initiating, from the disaster recovery site, a migration of the multi-tier application from the production site to the disaster recovery site.

In some examples, the multi-tier application may include a database tier configured for replication from a database cluster within the plurality of production clusters at the production site to a corresponding database cluster within the plurality of recovery clusters at the disaster recovery site. In these examples, identifying the failure of the multi-tier application may include identifying a fault in the replication of the database tier of the multi-tier application.

In some embodiments, identifying the failure of the multi-tier application may include identifying the failure from an agent executing within a cluster within the plurality of recovery clusters. In one example, identifying the failure of the multi-tier application may include identifying a user-initiated failover of the multi-tier application. In this example, identifying the user-initiated failover may include 1) identifying a status of each tier of the multi-tier application at the production site, 2) identifying, based on the status, at least one tier within the multi-tier application that is online, and 3) bringing the tier offline at the production site.

In one example, the migration may include 1) identifying a dependency map of the multi-tier application and 2) migrating each tier of the multi-tier application when, according to the dependency map, no additional tier dependent on the tier remains to be migrated.

In some examples, the computer-implemented method may also include 1) identifying a status of each tier of the multi-tier application at the production site and 2) identifying, based on the status, at least one concurrency violation during the migration of the multi-tier application. In some embodiments, the computer-implemented method may also include 1) identifying a secondary application executing on at least one of the plurality of recovery clusters, 2) determining that the secondary application has a priority lower than the multi-tier application, and 3) bringing the secondary application offline before initiating the migration in response to the priority. In one example, the computer-implemented method may also include 1) identifying a status of each tier of the multi-tier application at the production site and 2) displaying the status of each tier of the multi-tier application in an interface for initiating the migration of the multi-tier application.

In one embodiment, a system for implementing the above-described method may include 1) a detection module programmed to identify a multi-tier application that is provisioned with a plurality of production clusters at a production site, 2) an identification module programmed to identify a disaster recovery site including a plurality of recovery clusters, 3) a failure module programmed to identify, at the disaster recovery site, a failure of the multi-tier application at the production site, and 4) a migration module programmed to initiate, from the disaster recovery site, a migration of the multi-tier application from the production site to the disaster recovery site. The system may also include at least one processor configured to execute the detection module, the identification module, the failure module, and the migration module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a multi-tier application that is provisioned with a plurality of production clusters at a production site, 2) identify a disaster recovery site including a plurality of recovery clusters, 3) identify, at the disaster recovery site, a failure of the multi-tier application at the production site, and 4) initiate, from the disaster recovery site, a migration of the multi-tier application from the production site to the disaster recovery site.

As will be explained in greater detail below, by performing recovery management operations from one or more of the target clusters at the disaster recovery site, the systems and methods described herein may facilitate the disaster recovery of multi-tier applications from one site to another without creating a new single point of failure (e.g., a management server extraneous to either site). Furthermore, in some examples these systems and methods may automatically detect disasters and fail over to the recovery site.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
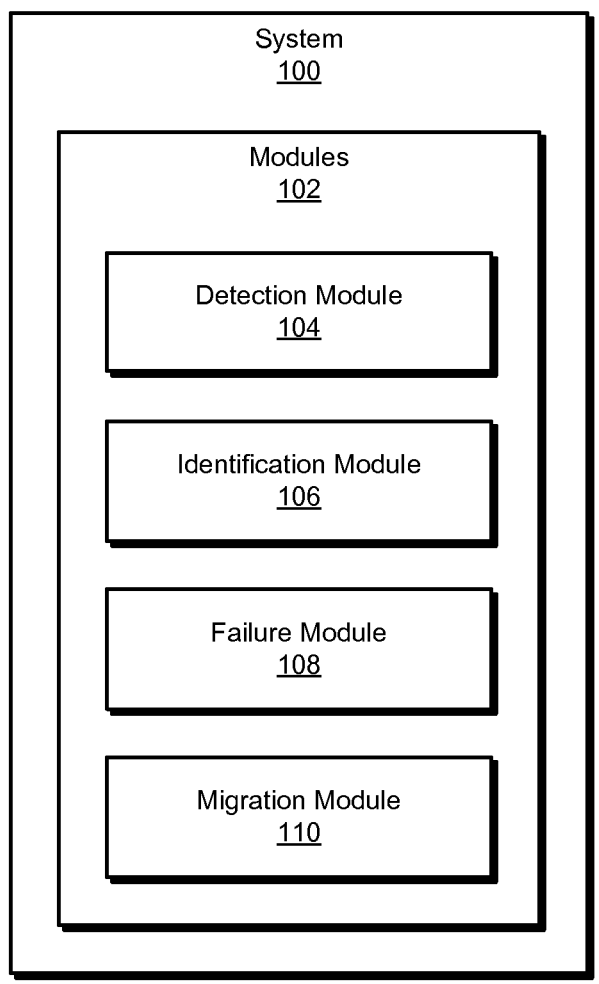
FIG. 1 is a block diagram of an exemplary system for disaster recovery of multi-tier applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
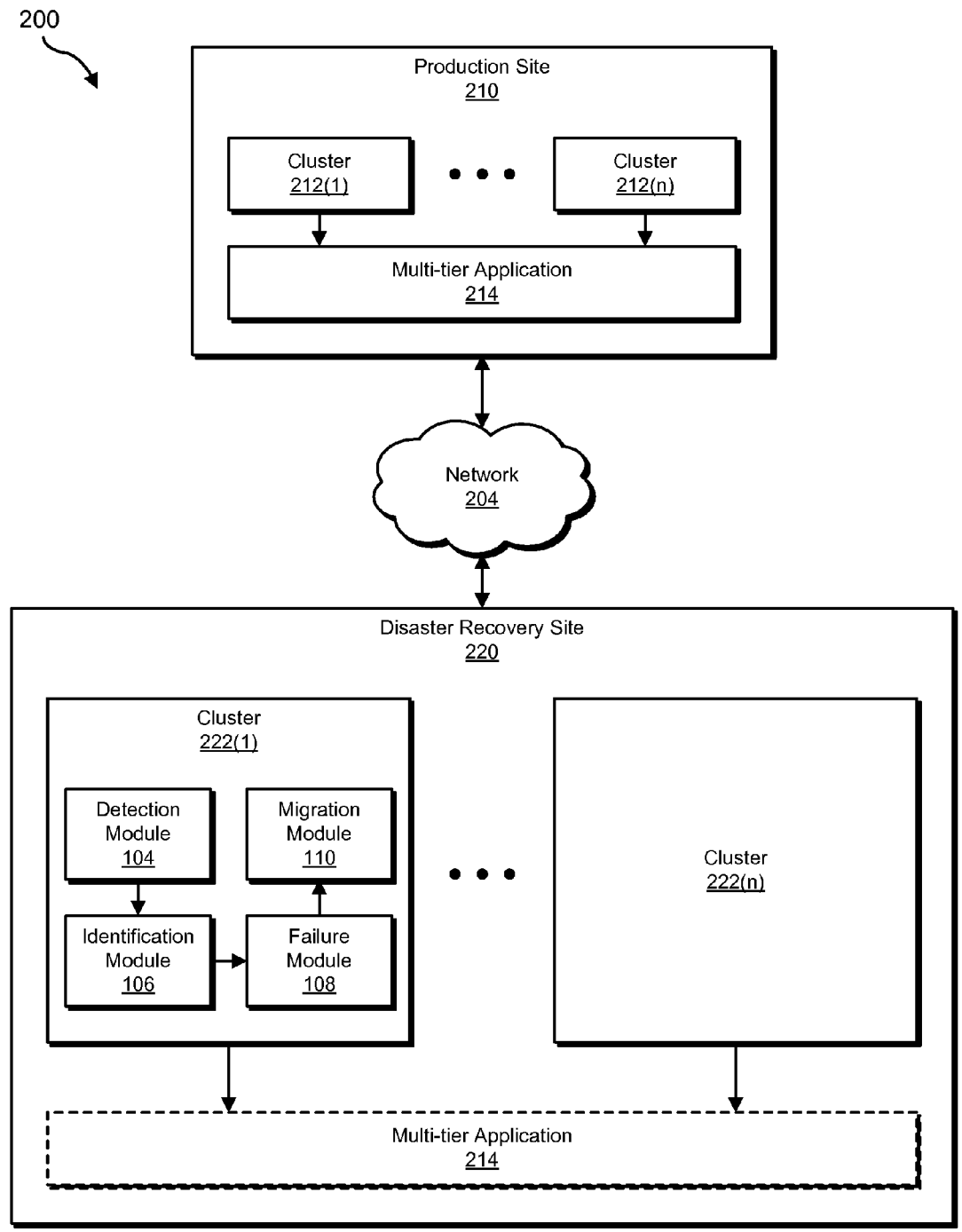
FIG. 2 is a block diagram of an exemplary system for disaster recovery of multi-tier applications.
Figure 3:
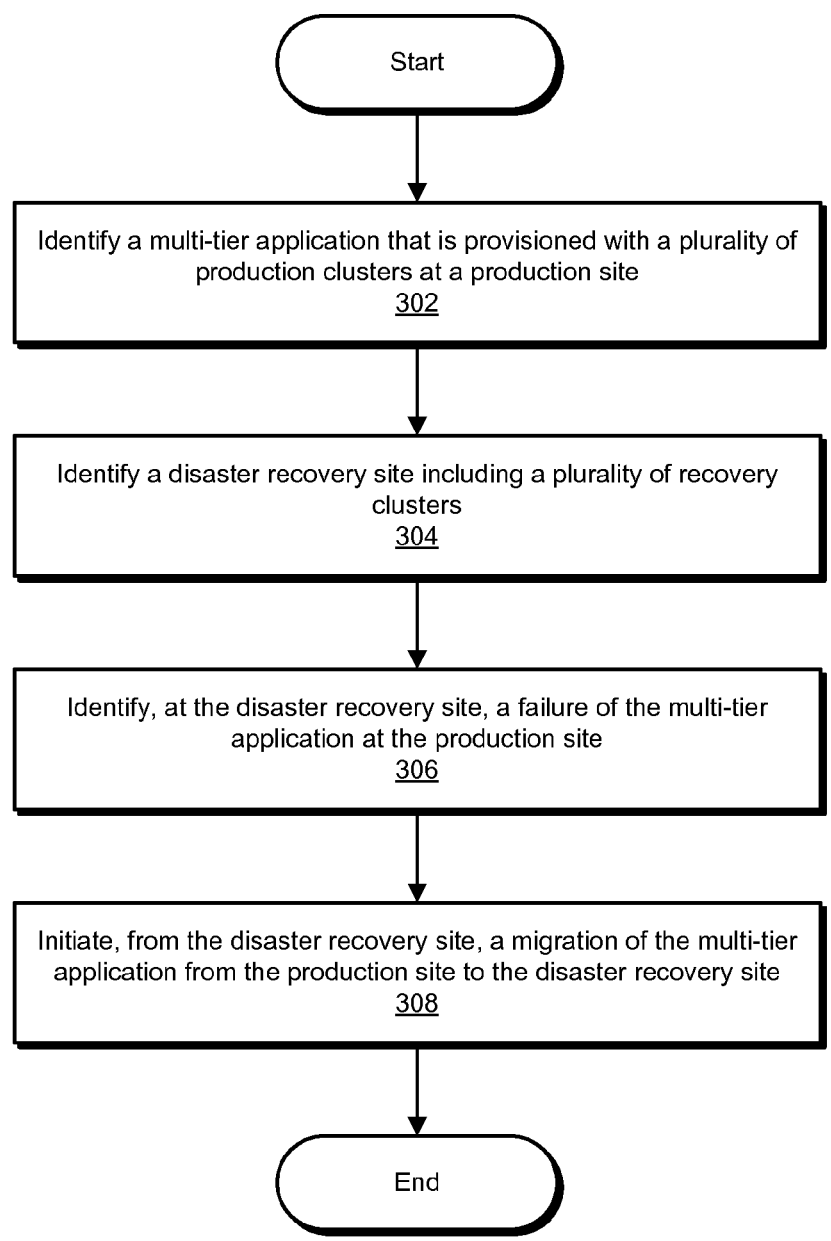
FIG. 3 is a flow diagram of an exemplary method for disaster recovery of multi-tier applications.
Figure 4:
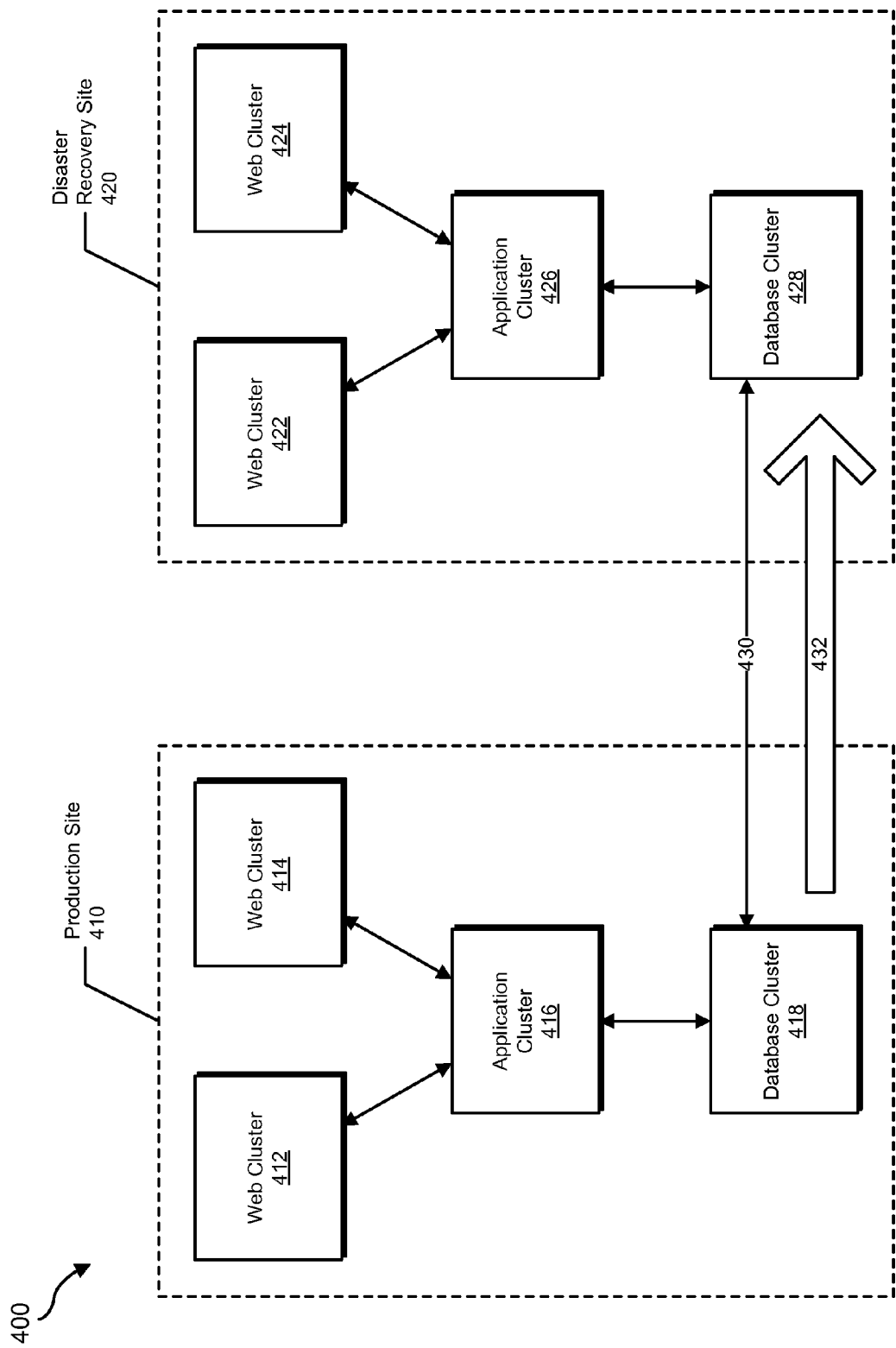
FIG. 4 is a block diagram of an exemplary system for disaster recovery of multi-tier applications.

The following will provide, with reference to FIGS. 1, 2, and 4, detailed descriptions of exemplary systems for disaster recovery of multi-tier applications. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for disaster recovery of multi-tier applications. As illustrated in this figure, exemplary system 100 may include one or more modules 102 for performing one or more tasks. For example, and as will be explained in greater detail below, exemplary system 100 may include a detection module 104 programmed to identify a multi-tier application that is provisioned with a plurality of production clusters at a production site. Exemplary system 100 may also include an identification module 106 programmed to identify a disaster recovery site including a plurality of recovery clusters.

In addition, and as will be described in greater detail below, exemplary system 100 may include a failure module 108 programmed to identify, at the disaster recovery site, a failure of the multi-tier application at the production site. Exemplary system 100 may also include a migration module 110 programmed to initiate, from the disaster recovery site, a migration of the multi-tier application from the production site to the disaster recovery site. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., clusters 212(1)-(n) and/or clusters 222(1)-(n)), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a production site 210 (e.g., with clusters 212(1)-(n)) in communication with a disaster recovery site (e.g., with clusters 222(1)-(n)) via a network 204. For example, clusters 222(1)-(n) at disaster recovery site 220 may be configured to resume operation of one or more portions of multi-tier application 214 in case of a failure at production site 210.

In one embodiment, one or more of modules 102 from FIG. 1 may, when executed by at least one processor of cluster 222(1), facilitate cluster 222(1) in disaster recovery of multi-tier applications. For example, and as will be described in greater detail below, one or more of modules 102 may cause cluster 222(1) to 1) identify multi-tier application 214 provisioned with a clusters 212(1)-(n) at production site 210, 2) identify disaster recovery site 220 including clusters 222(1)-(n), 3) identify, at disaster recovery site 220, a failure of multi-tier application 214 at production site 210, and 4) initiate, from disaster recovery site 220, a migration of multi-tier application 214 from production site 210 to disaster recovery site 220.

Clusters 212(1)-(n) and 222(1)-(n) generally represent any type or form of computing devices capable of reading computer-executable instructions. Examples of computing devices within clusters 212(1)-(n) and 222(1)-(n) include, without limitation, servers, desktops, laptops, tablets, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between production site 210 and disaster recovery site 220.

FIG. 3 is a flow diagram of an exemplary computer-implemented method 300 for disaster recovery of multi-tier applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a multi-tier application that is provisioned with a plurality of production clusters at a production site. For example, at step 302 detection module 104 may, as part of cluster 222(1) in FIG. 2, identify multi-tier application 214 provisioned with a clusters 212(1)-(n) at production site 210.

As used herein, the term "cluster" generally refers to any group of interconnected computing systems configured to coordinate to provide one or more services and/or to share a computational workload. As used herein, the term "site" may refer to a geographical location, a network location, and/or a group of computing devices. The phrase "production site" may refer to a site at which an application operates before a migration. Likewise, the phrase "recovery site" may refer to a site to which an application (or a portion of an application) may migrate and/or operate after migration.

As used herein, the phrase "multi-tier application" generally refers to any application with independently executable, locatable, and/or configurable components which, in combination, may provide a service. In some examples, each component of the multi-tier application may include a separate application. For example, a multi-tier application may include one or more database components, one or more business logic components, and/or one or more presentation components. In this example, the presentation component may present a user interface for the multi-tier application. The presentation component may communicate with the business logic component to process service requests and the business logic component may communicate with the database component to store and/or retrieve data. In some examples, the multi-tier application may be managed and/or presented as a virtual business service.

As will be explained in greater detail below, in some examples, the multi-tier application may include a database tier configured for replication from a database cluster within the plurality of production clusters at the production site to a corresponding database cluster within the plurality of recovery clusters at the disaster recovery site. As used herein, the term "replication" may refer to any scheme for maintaining an up-to-date copy of one or more data objects at another location.

Detection module 104 may identify the multi-tier application at the production site in any of a variety of ways. For example, detection module 104 may identify a configuration that specifies the production site as hosting the multi-tier application. Additionally or alternatively, detection module 104 may (e.g., as a part of an agent executing on one or more of the recovery clusters at the recovery site) receive a communication from the production site and/or identify a communication failure from the production site. In at least one example, detection module 104 may identify the multi-tier application at the production site based on administrator input.

FIG. 4 illustrates an exemplary system 400 for disaster recovery of multi-tier applications. As shown in FIG. 4, exemplary system 400 may include a production site 410 with several clusters (e.g., a web cluster 412, a web cluster 414, an application cluster 416, and a database cluster 418). In one example, the clusters of production site 410 may operate together to host a multi-tier application. Exemplary system 400 may also include a disaster recovery site 420 (e.g., configured to provide disaster recovery services for production site 410). As shown in FIG. 4, disaster recovery site 420 may include a web cluster 422 (e.g., corresponding to web cluster 412), a web cluster 424 (e.g., corresponding to web cluster 414), an application cluster 426 (e.g., corresponding to application cluster 416), and a database cluster 428 (e.g., corresponding to database cluster 418). Using FIG. 4 as an example, detection module 104 may, as a part of one or more of the clusters at disaster recovery site 420, identify the multi-tier application at production site 410.

In some examples, database cluster 418 and database cluster 428 may be configured to communicate on a layer 430. For example, database cluster 418 and/or one or more associated appliances may be configured with a replication 432 to replicate a database of database cluster 418 to disaster recovery site 420 for database cluster 428. In one example, detection module 104 may identify the multi-tier application at production site 410 by identifying layer 430 and/or replication 432.

Returning to FIG. 3, at step 304 one or more of the systems described herein may identify a disaster recovery site including a plurality of recovery clusters. For example, at step 304 identification module 106 may, as part of cluster 222(1) in FIG. 2, identify disaster recovery site 220 including clusters 222(1)-(n).

As used herein, the phrase "disaster recovery" may refer to any process of migrating at least a portion of an application to an alternate site in order to provide continuity of service. In some examples, the phrase "disaster recovery" may refer to a recovery of an application after an unplanned event (e.g., a disaster such as the failure of one or more computing devices, the loss of power at a computing facility, etc.). Additionally or alternatively, the phrase "disaster recovery" may refer to an administrator-initiated event.

Identification module 106 may identify the disaster recovery site in any suitable manner. For example, identification module 106 may identify the disaster recovery site by executing as an agent on one or more of the recovery clusters at the disaster recovery site.

Using FIG. 4 as an example, at step 304 identification module 106 may, as a part of web cluster 422, web cluster 424, application cluster 426, and/or database cluster 428, identify disaster recovery site 420.

Returning to FIG. 3, at step 306 one or more of the systems described herein may identify, at the disaster recovery site, a failure of the multi-tier application at the production site. For example, at step 306 failure module 108 may, as part of cluster 222(1) in FIG. 2, identify, at disaster recovery site 220, a failure of multi-tier application 214 at production site 210.

Failure module 108 may identify the failure of the multi-tier application in any of a variety of ways. For example, as mentioned earlier, in some examples the multi-tier application may include a database tier configured for replication from the production site to the disaster recovery site. In this example, failure module 108 may identify the failure by identifying a fault in the replication of the database tier of the multi-tier application. For example, failure module 108 may determine that a periodic expected communication on a global cluster link layer connecting the database tiers of the respective sites has failed.

In some examples, failure module 108 may identify the failure from an agent executing within a cluster within the plurality of recovery clusters. For example, the agent may be configured to monitor and/or receive status updates from the production site regarding the multi-tier application.

In one example, failure module 108 may identify the failure by identifying a user-initiated failover of the multi-tier application. For example, failure module 108 may identify an attempt by an administrator to bring up the multi-tier application at the disaster recovery site. In this example, failure module 108 may 1) identify a status of each tier of the multi-tier application at the production site, 2) identify, based on the status, at least one tier within the multi-tier application that is online, and 3) bring the tier offline at the production site. For example, failure module 108 may operate as a part of an agent on each recovery cluster for each tier of the multi-tier application and communicate with each corresponding production cluster to acquire the corresponding status.

In some examples, failure module 108 may identify a total failure of all tiers of the multi-tier application. Additionally or alternatively, failure module 108 may identify an isolated failure of one or more tiers of the multi-tier application.

Using FIG. 4 as an example, at step 306 failure module 108 may, as a part of one or more of the clusters of disaster recovery site 420, identify a failure of the multi-tier application at production site 410. For example, failure module 108 may, as a part of database cluster 428, determine that communications on layer 430 have failed.

Returning to FIG. 3, at step 308 one or more of the systems described herein may initiate, from the disaster recovery site, a migration of the multi-tier application from the production site to the disaster recovery site. For example, at step 308 migration module 110 may, as part of cluster 222(1) in FIG. 2, initiate, from disaster recovery site 220, a migration of multi-tier application 214 from production site 210 to disaster recovery site 220.

The migration may include any suitable steps. For example, the migration may include identifying a dependency map of the multi-tier application and migrating each tier of the multi-tier application when, according to the dependency map, no additional tier dependent on the tier remains to be migrated. For example, migration module 110 may, as a part of one or more of the recovery clusters at the disaster recovery site, identify the dependency map and migrate each tier when the dependencies of the tier are resolved.

In some examples, migration module 110 may 1) identify a status of each tier of the multi-tier application at the production site and 2) identify, based on the status, at least one concurrency violation during the migration of the multi-tier application. For example, when migration module 110 brings a tier of the multi-tier application online at the recovery site, migration module 110 may ensure that the tier is offline at the production site.

In some examples, migration module 110 may also 1) identify a secondary application executing on at least one of the plurality of recovery clusters, 2) determine that the secondary application has a priority lower than the multi-tier application, and 3) bring the secondary application offline before initiating the migration in response to the priority. For example, one or more of the recovery clusters at the disaster recovery site may be configured to host a low-priority application while the disaster recovery site is not needed for disaster recovery. Accordingly, migration module 110 may immediately bring the low-priority application offline when the disaster recovery site is needed to host the multi-tier application in place of the production site.

In some examples, migration module 110 may also 1) identify a status of each tier of the multi-tier application at the production site and 2) displaying the status of each tier of the multi-tier application in an interface for initiating the migration of the multi-tier application. For example, migration module 110 may display the status of each local tier of the multi-tier application and/or a global tier of the multi-tier application. In this example, an administrator may use the status information to determine the scope of a disaster and to determine to perform the migration.

As explained above, by performing recovery management operations from one or more of the target clusters at the disaster recovery site, the systems and methods described herein may facilitate the disaster recovery of multi-tier applications from one site to another without creating a new single point of failure (e.g., a management server extraneous to either site). Furthermore, in some examples these systems and methods may automatically detect disasters and fail over to the recovery site.

Figure 5:
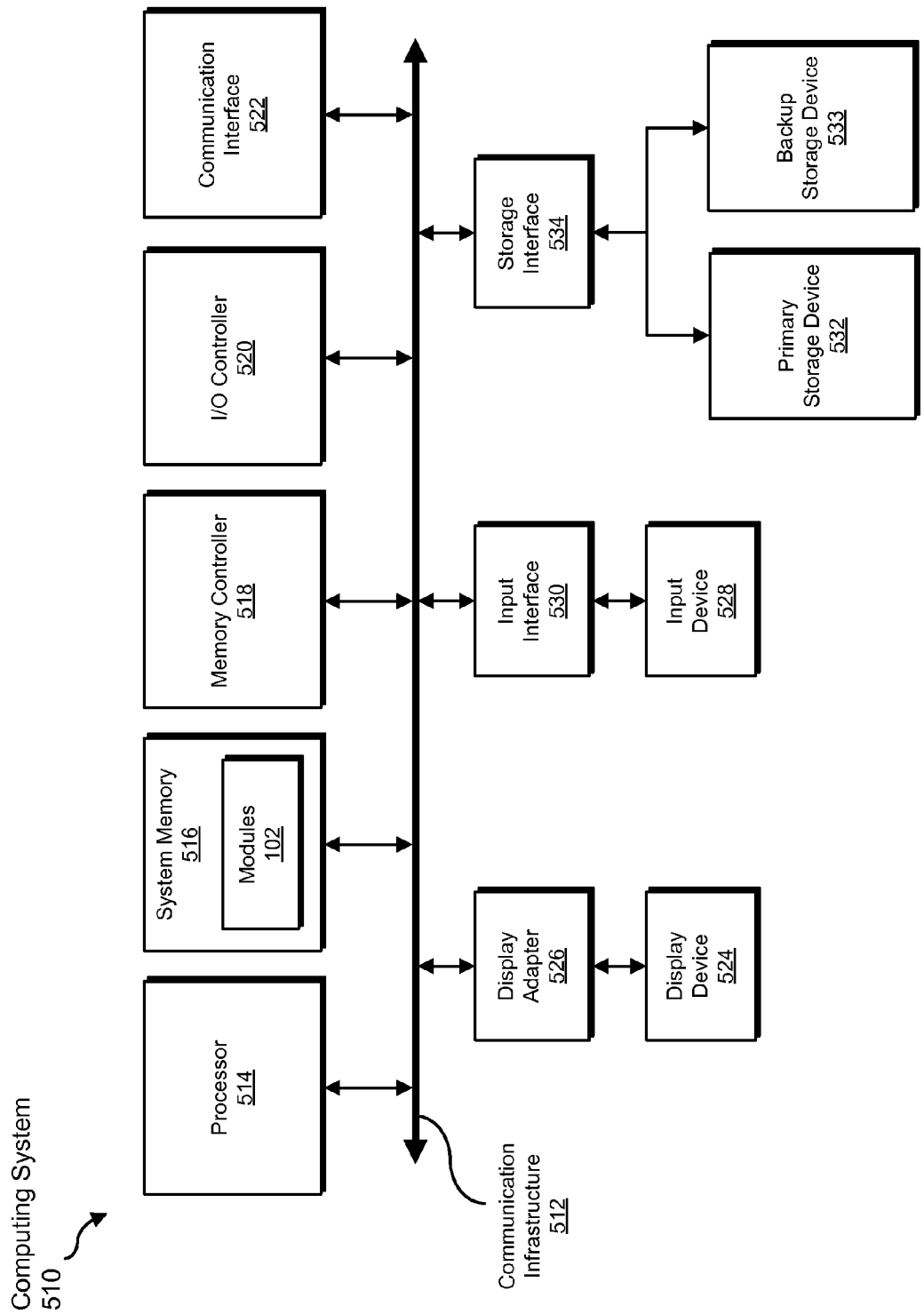
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, brining, initiating, migrating, determining, and displaying steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
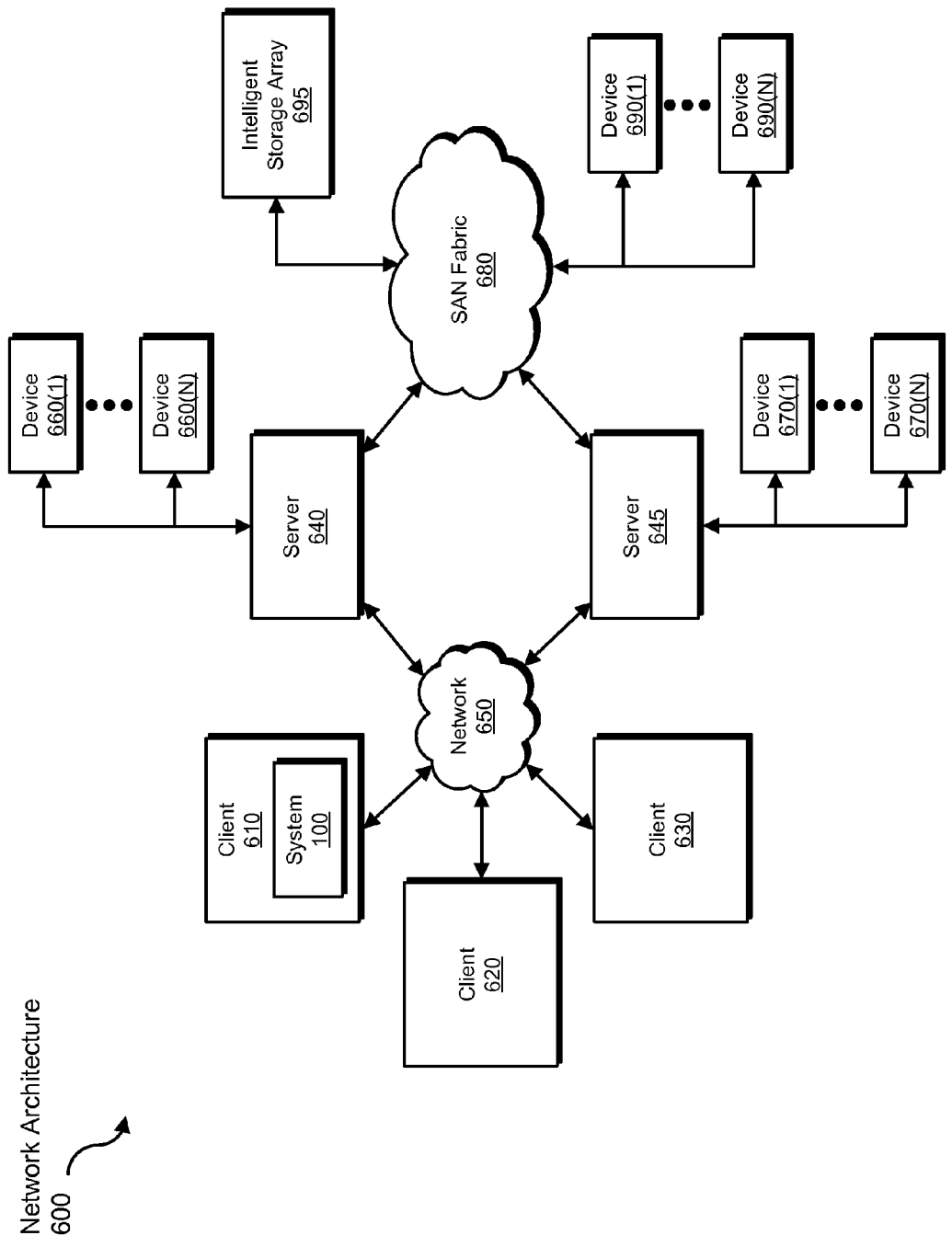
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, brining, initiating, migrating, determining, and displaying steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for disaster recovery of multi-tier applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for disaster recovery of multi-tier applications.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for disaster recovery of multi-tier applications, at least a portion of the method being performed by a computing device comprising at least one processor, the method comprising:
   identifying a multi-tier application that is provisioned with a plurality of production clusters at a production site;
   identifying a disaster recovery site comprising a plurality of recovery clusters;
   identifying, at the disaster recovery site, a failure of the multi-tier application at the production site;
   initiating, from the disaster recovery site, a migration of the multi-tier application from the production site to the disaster recovery site, wherein the migration comprises:
      identifying a dependency map of the multi-tier application;
      migrating each tier of the multi-tier application when, according to the dependency map, no additional tier dependent on the tier remains to be migrated.

2. The computer-implemented method of claim 1, wherein:
   the multi-tier application comprises a database tier configured for replication from a database cluster within the plurality of production clusters at the production site to a corresponding database cluster within the plurality of recovery clusters at the disaster recovery site;
   identifying the failure of the multi-tier application comprises identifying a fault in the replication of the database tier of the multi-tier application.

3. The computer-implemented method of claim 1, wherein identifying the failure at the disaster recovery site comprises identifying the failure from an agent executing within a cluster within the plurality of recovery clusters.

4. The computer-implemented method of claim 1, wherein identifying the failure comprises identifying a user-initiated failover of the multi-tier application.

5. The computer-implemented method of claim 4, wherein initiating the migration of the multi-tier application from the production site to the disaster recovery site comprises:
   identifying a status of each tier of the multi-tier application at the production site;
   identifying, based on the status, at least one tier within the multi-tier application that is online;
   bringing the tier offline at the production site.

6. The computer-implemented method of claim 1, further comprising:
   identifying a status of each tier of the multi-tier application at the production site;
   identifying, based on the status, at least one concurrency violation during the migration of the multi-tier application.

7. The computer-implemented method of claim 1, further comprising:
   identifying a secondary application executing on at least one of the plurality of recovery clusters;
   determining that the secondary application has a priority lower than the multi-tier application;
   bringing the secondary application offline before initiating the migration in response to the priority.

8. The computer-implemented method of claim 1, further comprising:
   identifying a status of each tier of the multi-tier application at the production site;
   displaying the status of each tier of the multi-tier application in an interface for initiating the migration of the multi-tier application.

9. A system for disaster recovery of multi-tier applications, the system comprising:
   a detection module programmed to identify a multi-tier application that is provisioned with a plurality of production clusters at a production site;
   an identification module programmed to identify a disaster recovery site comprising a plurality of recovery clusters;
   a failure module programmed to identify, at the disaster recovery site, a failure of the multi-tier application at the production site;
   a migration module programmed to initiate, from the disaster recovery site, a migration of the multi-tier application from the production site to the disaster recovery site, wherein the migration comprises:
      identifying a dependency map of the multi-tier application;
      migrating each tier of the multi-tier application when, according to the dependency map, no additional tier dependent on the tier remains to be migrated;
   at least one hardware processor configured to execute the detection module, the identification module, the failure module, and the migration module.

10. The system of claim 9, wherein:
    the multi-tier application comprises a database tier configured for replication from a database cluster within the plurality of production clusters at the production site to a corresponding database cluster within the plurality of recovery clusters at the disaster recovery site;
    the failure module is programmed to identify the failure of the multi-tier application by identifying a fault in the replication of the database tier of the multi-tier application.

11. The system of claim 9, wherein the failure module is programmed to identify the failure at the disaster recovery site by identifying the failure from an agent executing within a cluster within the plurality of recovery clusters.

12. The system of claim 9, wherein the failure module is programmed to identify the failure by identifying a user-initiated failover of the multi-tier application.

13. The system of claim 12, wherein the migration module is programmed to initiate the migration of the multi-tier application from the production site to the disaster recovery site by:
    identifying a status of each tier of the multi-tier application at the production site;
    identifying, based on the status, at least one tier within the multi-tier application that is online;
    bringing the tier offline at the production site.

14. The system of claim 9, wherein the migration module is further programmed to:
    identify a status of each tier of the multi-tier application at the production site;
    identify, based on the status, at least one concurrency violation during the migration of the multi-tier application.

15. The system of claim 9, wherein the migration module is further programmed to:
    identify a secondary application executing on at least one of the plurality of recovery clusters;
    determine that the secondary application has a priority lower than the multi-tier application;

bring the secondary application offline before initiating the migration in response to the priority.

16. The system of claim 9, wherein the migration module is further programmed to:
identify a status of each tier of the multi-tier application at the production site;
display the status of each tier of the multi-tier application in an interface for initiating the migration of the multi-tier application.

17. A non-transitory computer-readable-storage medium comprising one or more computer-executable instructions that, when executed by at least one processor of a computing device, cause the computing device to:
identify a multi-tier application that is provisioned with a plurality of production clusters at a production site;
identify a disaster recovery site comprising a plurality of recovery clusters;
identify, at the disaster recovery site, a failure of the multi-tier application at the production site;
initiate, from the disaster recovery site, a migration of the multi-tier application from the production site to the disaster recovery site, wherein the migration comprises:
identifying a dependency map of the multi-tier application;
migrating each tier of the multi-tier application when, according to the dependency map, no additional tier dependent on the tier remains to be migrated.

18. The computer-readable-storage medium of claim 17, wherein:
the multi-tier application comprises a database tier configured for replication from a database cluster within the plurality of production clusters at the production site to a corresponding database cluster within the plurality of recovery clusters at the disaster recovery site;
the one or more computer-executable instructions cause the computing device to identify the failure of the multi-tier application by causing the computing device to identify a fault in the replication of the database tier of the multi-tier application.

19. The computer-readable-storage medium of claim 17, wherein:
the multi-tier application comprises a database tier configured for replication from a database cluster within the plurality of production clusters at the production site to a corresponding database cluster within the plurality of recovery clusters at the disaster recovery site;
the one or more computer-executable instructions cause the computing device to identify the failure of the multi-tier application by causing the computing device to identify a fault in the replication of the database tier of the multi-tier application.

20. The computer-readable-storage medium of claim 17, wherein the one or more computer-executable instructions cause the computing device to identify the failure at the disaster recovery site by causing the computing device to identify the failure from an agent executing within a cluster within the plurality of recovery clusters.

* * * * *